(12) United States Patent
Zhe (10) Patent No.: US 10,110,525 B2
(45) Date of Patent: Oct. 23, 2018

(54) METHOD AND DEVICE FOR INTERACTION BETWEEN SMART WATCH AND WECHAT PLATFORM, AND SMART WATCH

(71) Applicant: GOERTEK INC., Weifang (CN)

(72) Inventor: Huang Zhe, Weifang (CN)

(73) Assignee: GOERTEK INC., Weifang (CN)

(*) Notice: Subject to any disclaimer, the term of this patent is extended or adjusted under 35 U.S.C. 154(b) by 0 days.

(21) Appl. No.: 15/522,400

(22) PCT Filed: Jun. 23, 2016

(86) PCT No.: PCT/CN2016/086935
§ 371 (c)(1),
(2) Date: Apr. 27, 2017

(87) PCT Pub. No.: WO2017/113654
PCT Pub. Date: Jul. 6, 2017

(65) Prior Publication Data
US 2018/0041453 A1   Feb. 8, 2018

(30) Foreign Application Priority Data
Dec. 28, 2015   (CN) .......................... 2015 1 1003747

(51) Int. Cl.
*G06F 15/16* (2006.01)
*H04L 12/58* (2006.01)
(Continued)

(52) U.S. Cl.
CPC ............ *H04L 51/046* (2013.01); *G10L 15/22* (2013.01); *G10L 15/265* (2013.01); *H04L 67/02* (2013.01);
(Continued)

(58) Field of Classification Search
None
See application file for complete search history.

(56) References Cited

U.S. PATENT DOCUMENTS

2014/0089436 A1 * 3/2014 Zhang .................. H04L 51/30
709/206
2014/0344375 A1   11/2014 Hauser et al.

FOREIGN PATENT DOCUMENTS

CN   104320406 A   1/2015
CN   104836897 A   8/2015

OTHER PUBLICATIONS

International Search Report dated Sep. 21, 2016 for PCT Application No. PCT/CN2016/086935.

* cited by examiner

*Primary Examiner* — Brian Whipple
(74) *Attorney, Agent, or Firm* — Moser Taboada (57) ABSTRACT

The present disclosure discloses a method and a device for interaction between a smart watch and a WECHAT platform, and a smart watch. The method comprises: providing a customized browser that is adapted to the smart watch on the smart watch end, wherein the customized browser is able to access a webpage edition WECHAT platform; wirelessly connecting and pairing the smart watch end with a mobile telephone end, and after the pairing is successfully completed, making the smart watch end wirelessly connect to a network side via the mobile telephone end; after WECHAT function on the smart watch starts up, accessing the webpage edition WECHAT platform by the customized browser, and logging in on the webpage edition WECHAT platform according to user information that is bound on the mobile telephone end; and upon receiving a WECHAT message reminder that is pushed by the webpage edition WECHAT platform to the smart watch end, generating a WECHAT replying message according to an instruction that is input by the user, and transmitting the WECHAT replying message to the network end via the wireless connection, to perform
(Continued)

WECHAT replying, thereby realizing replying a WECHAT message on the smart watch platform.

14 Claims, 5 Drawing Sheets

(51) Int. Cl.
*H04W 4/00* (2018.01)
*H04W 4/80* (2018.01)
*H04W 76/10* (2018.01)
*G10L 15/22* (2006.01)
*G10L 15/26* (2006.01)
*H04W 4/12* (2009.01)
*H04L 29/08* (2006.01)

(52) U.S. Cl.
CPC ............... *H04L 67/04* (2013.01); *H04W 4/00* (2013.01); *H04W 4/12* (2013.01); *H04W 4/80* (2018.02); *H04W 76/10* (2018.02); *G10L 2015/223* (2013.01)

METHOD AND DEVICE FOR INTERACTION BETWEEN SMART WATCH AND WECHAT PLATFORM, AND SMART WATCH

TECHNICAL FIELD

The present disclosure relates to the technical field of network technique, and specifically to a method and a device for interaction between a smart watch and a WECHAT platform, and a smart watch.

BACKGROUND

Currently, there are mainly two methods of performing WECHAT replying on smart watches: one is to use a standard Androidwear system by the authorization of Google, and another is to acquire the standard interface of the WECHAT to perform message reminding and message replying. The Androidwear system cannot be used in China because of the current situation of Google in China. TENCENT only opens part of the functional interfaces of the WECHAT to the public, so the current smart watch platform can only perform WECHAT reminding, and cannot perform WECHAT message replying. On the basis of this condition, a further communication mode of realizing the replying of WECHAT messages on smart watches is required.

SUMMARY

In the light of the above description, the present disclosure provides a method and device for interaction between a smart watch and a WECHAT platform, and a smart watch, in order to solve the problem that the smart watches of the prior art cannot reply WECHAT messages.

In order to achieve the above objects, the technical solutions of the present disclosure are implemented as follows:

In an aspect, the present disclosure provides a method for interaction between a smart watch and a WECHAT platform, the method comprising:

providing a customized browser that is adapted to the smart watch on the smart watch end, wherein the customized browser is able to access a webpage edition WECHAT platform;

wirelessly connecting and pairing the smart watch end with a mobile telephone end, and after the pairing is successfully completed, making the smart watch end wirelessly connect to a network side via the mobile telephone end;

after WECHAT function on the smart watch starts up, accessing the webpage edition WECHAT platform by the customized browser, and logging in on the webpage edition WECHAT platform based on user information that is bound on the mobile telephone end; and upon receiving a WECHAT message reminder that is pushed by the webpage edition WECHAT platform to the smart watch end, generating a WECHAT replying message based on an instruction that is input by the user, and transmitting the WECHAT replying message to the network side, via the wireless connection, to perform WECHAT replying.

In another aspect, the present disclosure further provides a device for interaction between a smart watch and a WECHAT platform, the device for interaction comprising:

a wireless network connecting module, for wirelessly connecting and pairing the smart watch end with a mobile telephone end, and after the pairing is successfully completed, making the smart watch end wirelessly connect to a network side via the mobile telephone end;

an accessing and logging-in module, for after WECHAT function on the smart watch starts up, accessing a webpage edition WECHAT platform by a customized browser that is preset and is adapted to the smart watch, and logging in on the webpage edition WECHAT platform based on user information that is bound on the mobile telephone end; and a replying module, for upon receiving a WECHAT message reminder that is pushed by the webpage edition WECHAT platform to the smart watch end, generating a WECHAT replying message based on an instruction that is input by the user, and transmitting the WECHAT replying message to the network side, via the wireless connection, to perform WECHAT replying.

In another aspect, the present disclosure further provides a smart watch, the smart watch comprising the interaction device that is provided by the above solution; and the smart watch is provided with a customized browser that is adapted to the smart watch, wherein the customized browser is able to log in on the webpage edition WECHAT platform.

The advantageous effects of the embodiments of the present disclosure are: the present disclosure provides the customized browser on the smart watch end, and after the Bluetooth pairing and connecting between the smart watch and the mobile telephone is completed, the customized browser of the smart watch end may wirelessly connect to the network side via Bluetooth, to improve the overall stand-by time of the smart watch end by using the characteristic of low power dissipation of Bluetooth wireless connection; and after the smart watch end is connected to the network side, log in on the webpage edition WECHAT platform by using the customized browser, and on the basis of the Bluetooth transport protocol, exchange data with the WECHAT platform, to realize WECHAT message replying on the smart watch end.

BRIEF DESCRIPTION OF THE DRAWINGS

The drawings are intended to provide a further understanding of the present disclosure, and constitute part of the description. The drawings are intended to interpret present disclosure along with the embodiments of the present disclosure, and do not function to limit the present disclosure. In the drawings.

DETAILED DESCRIPTION

In order to make the objects, technical solutions and advantages of the present disclosure clearer, the embodiments of the present disclosure will be further described in detail below in combination with the drawings. Further, it is well-known that WECHAT is a multi-purpose messaging, social media and mobile payment application provided by TENCENT of Schenzen, China, and is referred to herein throughout as "WECHAT."

The overall design concept of the present disclosure is: providing a customized browser on an smart watch end, accessing and logging in on the webpage edition WECHAT via the customized browser, and on the basis of wireless transmission protocols, causing the smart watch end to exchange data with the WECHAT platform via the customized browser, to realize the replying to WECHAT reminders on the smart watch end.

The First Embodiment

Figure 1:
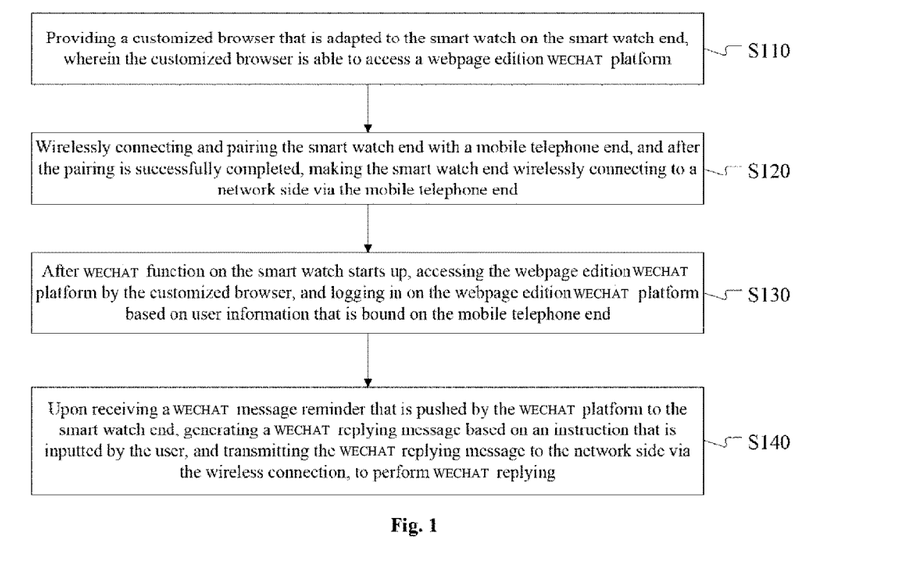
FIG. 1 is the flow chart of the method for interaction between a smart watch and a WECHAT platform provided by the first embodiment.

FIG. 1 is the flow chart of the method for interaction between a smart watch and WECHAT platform provided by the present embodiment. As shown in FIG. 1, the method for interaction comprises:

S110, providing a customized browser that is adapted to the smart watch on the smart watch end, wherein the customized browser is able to access a webpage edition WECHAT platform.

A webpage interface of the customized browser is adapted to a screen of the smart watch, and the customized browser supports a preset application protocol and a preset communication protocol, wherein, the preset application protocol comprises at least the Hyper Text Transfer Protocol (HTTP protocol) and the User Datagram Protocol (UDP protocol), and the preset communication protocol comprises at least the Bluetooth Network Encapsulation Protocol (BNEP protocol).

The present embodiment preferably enables the webpage interface of the customized browser to be adapted to the screen of the smart watch by the following method:

1: acquiring a system architecture of the webpage edition WECHAT platform, and determining functional modules that constitute the webpage edition WECHAT based on the acquired system architecture of the webpage edition WECHAT platform;

2: based on a size and a shape of the screen of the smart watch, determining layout mode of the functional modules of the webpage edition WECHAT in the webpage interface of the customized browser;

3: in accordance with the layout mode of the functional modules of the webpage edition WECHAT in the webpage interface of the customized browser, displaying the functional modules in the webpage interface of the customized browser.

Alternatively, the above Steps 1 to 3 are implemented on a browser development platform (for example, the Android development platform).

Figure 2:
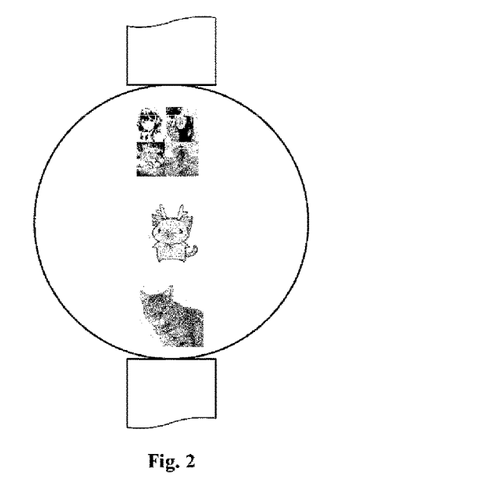
FIG. 2 shows the schematic diagram when the customized browser enters the friend list interface.
Figure 3:
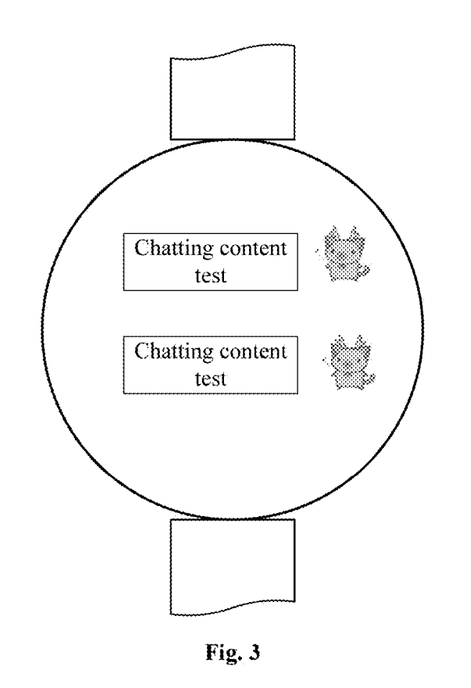
FIG. 3 shows the schematic diagram when the customized browser enters the chatting record interface.
Figure 4:
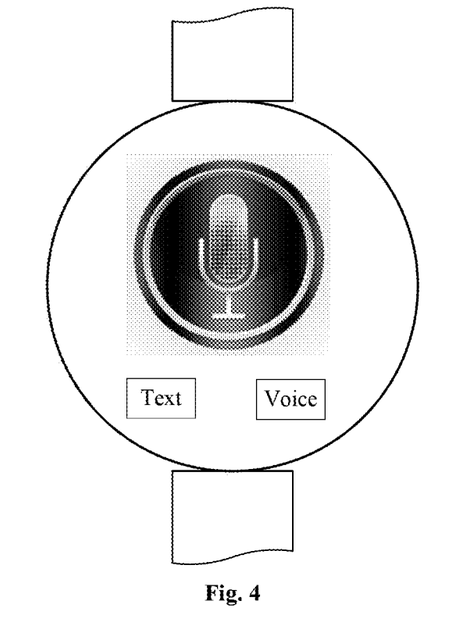
FIG. 4 shows the schematic diagram when the customized browser enters the replying interface.

FIG. 2 to FIG. 4 respectively show the schematic diagrams when the customized browser enters a friend list interface, a chatting record interface and a replying interface. It can be seen from FIG. 2 to FIG. 4 that, the customized browser of the present embodiment, after logging in on the webpage edition WECHAT platform, can singly display each of the functional modules of the webpage edition WECHAT platform, which facilitates using the relevant functions of the webpage edition WECHAT on small screens of smart watches, thereby improving the usage experience.

In order to further improve the usage experience, and facilitate the user operating the WECHAT functions that are displayed on the customized browser, the present embodiment configures a user interface interaction mode of the customized browser and a switching mode between different user interface interaction modes by the following method, wherein the user interface interaction mode comprises a friend list interface mode, a chatting record interface mode and a replying interface mode.

Specifically, the present embodiment configures a user interface interaction mode of the customized browser and a switching mode between different user interface interaction modes, so that when the customized browser is switched to the friend list interface mode, the present embodiment, in response to a slipping operation by the user on the screen of the smart watch, displays one or more friend list information on the screen. As shown in FIG. 2, the user upwardly and downwardly slips on the screen of the smart watch, to display other friend information on the screen.

When the customized browser is switched to the chatting record interface mode, the present embodiment, in response to a slipping operation by the user on the screen of the smart watch, displays one or more chatting record information on the screen. As shown in FIG. 3, the user upwardly and downwardly slips on the screen of the smart watch, to display other friend information on the screen.

When the customized browser is switched to the replying interface mode, the present embodiment, in response to a point-and-click operation or long-pressing operation by the user on the screen of the smart watch, generates WECHAT replying message and displays the generated WECHAT replying message on the screen. As shown in FIG. 4, the user points and clicks the microphone icon that is displayed on the screen of the smart watch, a WECHAT replying message is generated, then the user points and clicks the WECHAT replying message format that is displayed on the screen of the smart watch, and if the text format is pointed and clicked, the WECHAT replying message is generated and sent to the WECHAT platform in the text format, and if the voice format is pointed and clicked, the WECHAT replying message is generated and sent to the WECHAT platform in the voice format.

S120, the smart watch may, based on a received user command, wirelessly connect and pair the smart watch end with a mobile telephone end, and after the pairing is successfully completed, the smart watch end wirelessly connect to a network end via the mobile telephone end.

Because relatively lower capacities of the batteries of smart watches, if a persistent connection of wireless mode such as Wifi is used, the overall stand-by time of smart watches will be affected. Therefore, the present embodiment preferably makes a Bluetooth wireless connection with the mobile telephone end via Bluetooth, so that when the smart watch has no Wifi wireless access, the smart watch accesses the Internet by the Bluetooth pairing and connecting between the mobile telephone and the smart watch, and implements the logging-in of the webpage edition WECHAT on the customized browser by scanning a WECHAT two-dimensional code, thereby replying WECHAT messages.

S130, after WECHAT function on the smart watch starts up, the smart watch accesses the webpage edition WECHAT platform by the customized browser, and logs in on the webpage edition WECHAT platform based on user information that is bound on the mobile telephone end.

S140, upon receiving a WECHAT message reminder that is pushed by the webpage edition WECHAT platform to the smart watch end, the smart watch generates a WECHAT replying message based on an instruction that is input by the user, and transmits the WECHAT replying message to the network side, via the wireless connection, to perform WECHAT replying.

Regarding the WECHAT message reminder in the present step, the method can utilize the corresponding WECHAT interface that is provided by Tencent to receive on the smart watch end the WECHAT message reminder that is sent by the WECHAT platform, and can also utilize a wireless communication protocol that is supported by the customized browser to receive the WECHAT message reminder that is sent by the WECHAT platform.

Regarding the screen size of the smart watch, the method can collect user voice on the smart watch end, and convert the collected user voice into a corresponding instruction that is input by the user. In that, the instruction that is input by the user of the present embodiment comprises a text instruction and a voice instruction, and thus the "generating a WECHAT replying message based on an instruction that is input by the user" in Step S140 comprises:

collecting user voice on the smart watch end, converting the collected user voice into a text, and generating a text instruction based on the converted text;

or, collecting user voice on the smart watch end, generating a voice file from the collected user voice, and generating a voice instruction based on the voice file.

The present embodiment provides a customized browser on a smart watch end, and after the Bluetooth pairing and connecting between the smart watch and the mobile telephone is completed, the customized browser of the smart watch end may wirelessly connect to the network side via Bluetooth, to improve the overall stand-by time of the smart watch end by using the characteristic of low power dissipation of Bluetooth wireless connection; and after the smart watch end is connected to the network side, log in on the webpage edition WECHAT platform by using the customized browser, and on the basis of the Bluetooth transport protocol, exchange data with the WECHAT platform, to realize WECHAT message replying on the smart watch end.

Because the present embodiment is not required to download and install the WECHAT application on the smart watch end, it can save the storage space of the smart watch end. In addition, the webpage edition WECHAT is a resource that Tencent provides to the public, and has reliable stability and security, and as long as the stability of the network connection is maintained, the user may realize the logging-in of the webpage edition WECHAT on the smart watch end by quick logging-in modes such as scanning a two-dimensional code. The present embodiment can also share a same account with the WECHAT clients on other mobile platforms, to realize the synchronization of WECHAT messages.

In an application scene of the present embodiment, the method specifically describes the process that the smart watch end wirelessly connects to the smart phone by Bluetooth and performs WECHAT message replying.

Figure 5:
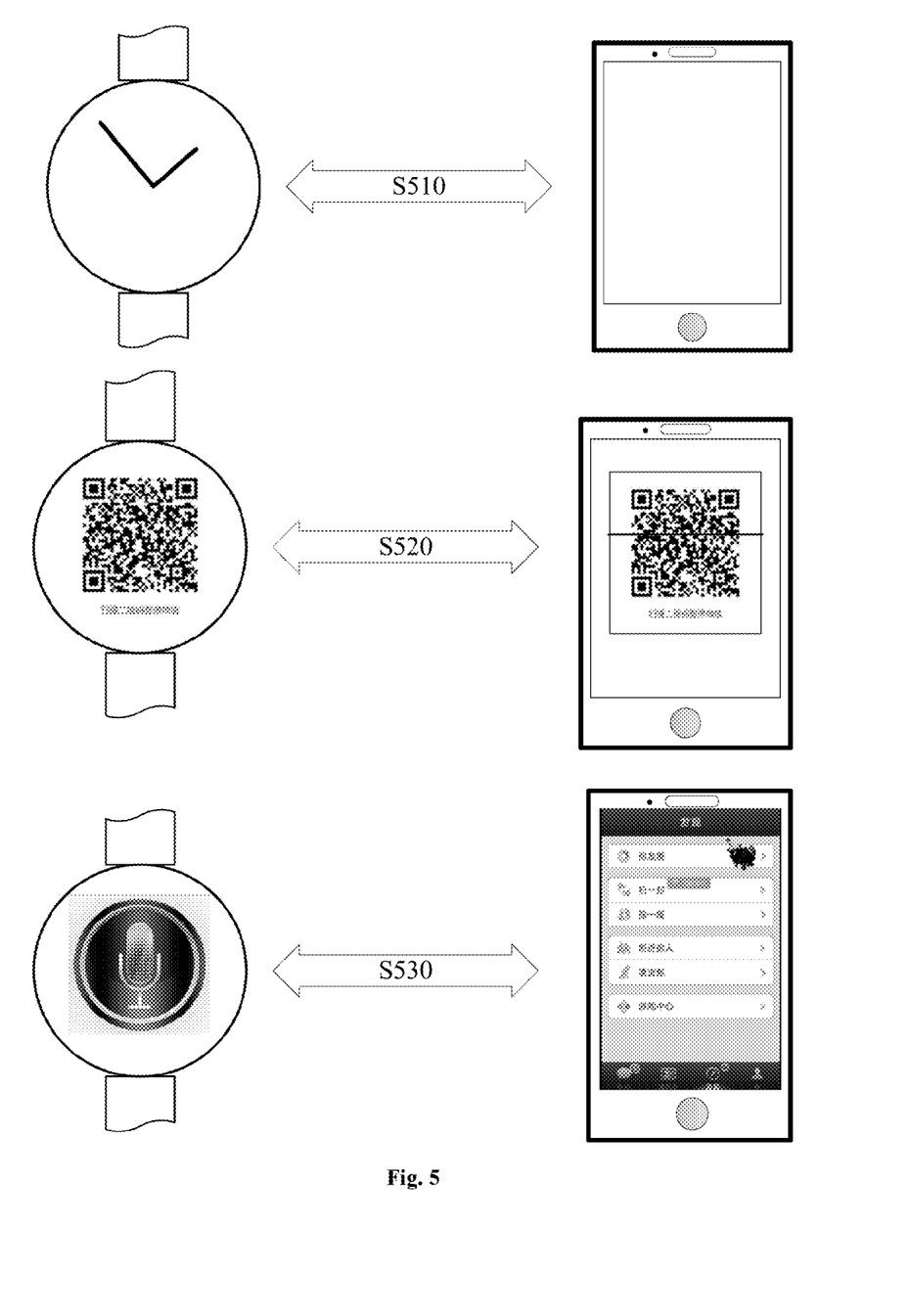
FIG. 5 shows the schematic diagram of the process of the pairing and connecting of the smart watch with the smart phone via the customized browser.

FIG. 5 shows the schematic diagram of the process of the pairing and connecting of the smart watch with the smart phone via the customized browser. As shown in FIG. 5, the process of the pairing and connecting of the smart watch with the smart phone via the customized browser is:

S510, by using the Bluetooth function of the smart watch end, performing Bluetooth wireless connection and pairing with the smart phone.

S520, after the pairing between the smart watch and the smart phone is successfully completed, the smart watch wirelessly connects to the network side by the ipv4/ipv6 of Bluetooth Network Encapsulation Protocol (BNEP), and according to the logging-in instruction of the user, by using the customized browser of the smart watch end, logs in on the webpage edition WECHAT, to enter the logging-in interface of the webpage edition WECHAT; and after the smart phone validates and admits (a quick verification mode of scanning by the smart phone the watch two-dimensional code on the smart watch can be adopted), the customized browser successfully logs in on the webpage edition WECHAT platform, and synchronizes with the WECHAT on the smart phone end.

S530, upon receiving a WECHAT message reminder, the smart watch enters the replying interface, collects user voice by using a microphone, converts the collected user voice data into a WECHAT replying message of a corresponding format, and sends the WECHAT replying message to the WECHAT platform by using Bluetooth Network Encapsulation Protocol (BNEP).

Figure 6:
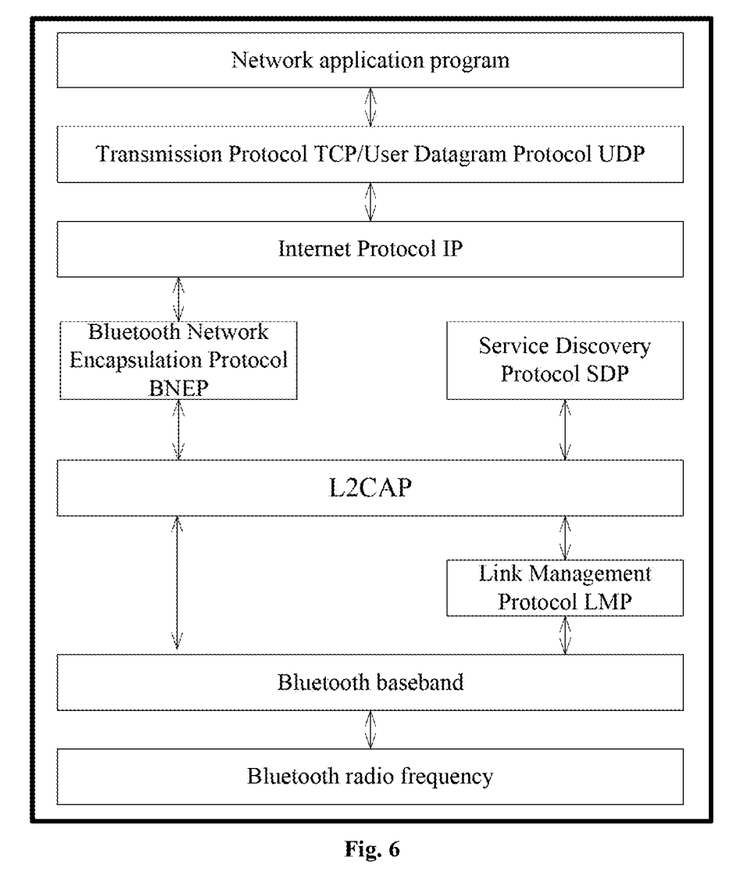
FIG. 6 shows the schematic diagram of the architecture of Bluetooth Network Encapsulation Protocol (BNEP)
Figure 7:
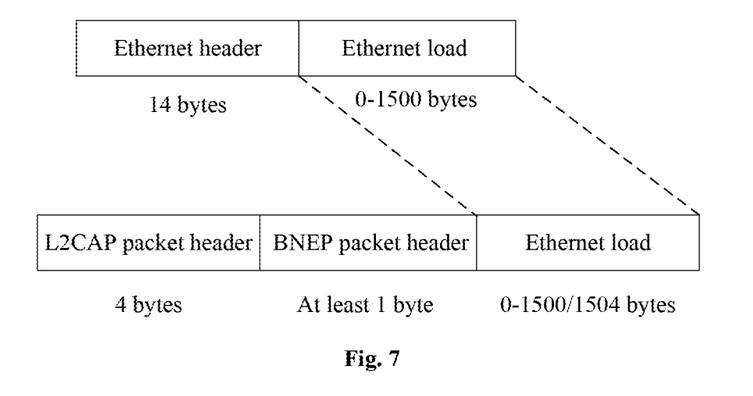
FIG. 7 shows the schematic diagram of the data packet format of Bluetooth Network Encapsulation Protocol (BNEP)

In that, the architecture of Bluetooth Network Encapsulation Protocol (BNEP) is as shown in FIG. 6. In order that the smart watch that integrates the Bluetooth technology can exchange data with the WECHAT platform on the network side, it is required to unify the data grouping in the network layer. Bluetooth Network Encapsulation Protocol (BNEP) repackages the data groupings from different networks, and transmits by L2CAP. Specifically, the data packets that BNEP receives in FIG. 6 are in the format of Ethernet, and the data packets in the format of Ethernet are required to be split and repackaged to be suitable for the L2CAP transmitting of BNEP. Therefore, when the data are transmitted to the BNEP layer, it is required to remove the Ethernet header of the IP layer and add the BNEP header, and when the BNEP packet is transmitted to the L2CAP layer, it is added a L2CAP header. The format conversion of the data packet header is as shown in FIG. 7.

The embodiment of the present disclosure, on the basis of Bluetooth transport protocol, after the Bluetooth pairing between the smart watch and the smart phone is completed, logs in on the WECHAT function by using the browser, to realize that the smart phone and the smart watch share the same account, and uses an input method module having a voice-to-text conversion function and a voice file recording function, to realize the text and voice replying of the WECHAT.

The Second Embodiment

On the basis of the same technical concept as that of the first embodiment, the present embodiment provides a device for interaction between a smart watch and WECHAT platform.

Figure 8:
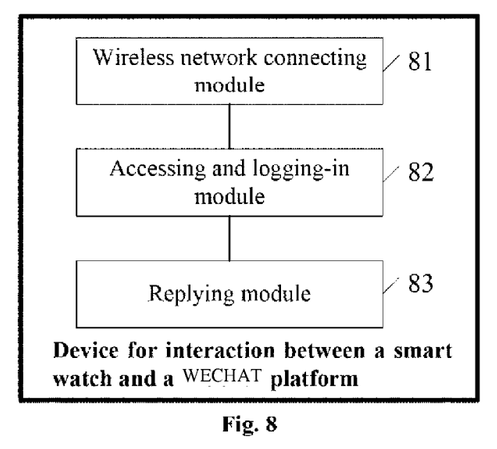
FIG. 8 is the schematic diagram of the device for interaction between a smart watch and a WECHAT platform provided by the second embodiment.

FIG. 8 is the schematic diagram of the device for interaction between a smart watch and WECHAT platform provided by the present embodiment. As shown in FIG. 8, the device for interaction comprises:

a wireless network connecting module 81, for wirelessly connecting and pairing the smart watch end with a mobile telephone end, and after the pairing is successfully completed, making the smart watch end wirelessly connect to a network side via the mobile telephone end;

preferably, the wireless network connecting module 81 is specifically for wirelessly connecting the smart watch end and the mobile telephone end by a Bluetooth Network Encapsulation Protocol (BNEP);

an accessing and logging-in module 82, for after WECHAT function on the smart watch starts up, accessing a webpage edition WECHAT platform by a customized browser that is preset and is adapted to the smart watch, and logging in on the webpage edition WECHAT platform based on user information that is bound on the mobile telephone end; and a replying module 83, for upon receiving a WECHAT message reminder that is pushed by the webpage edition WECHAT platform to the smart watch end, generating a WECHAT replying message based on an instruction that is input by the user, and transmitting the WECHAT replying message to the network side, via the wireless connection, to perform WECHAT replying.

The device for interaction of the present embodiment further comprises: an inputting module, for collecting user voice on the smart watch end, converting the collected user voice into a text, and generating a text instruction based on the converted text; or, for collecting user voice on the smart watch end, generating a voice file from the collected user voice, and generating a voice instruction based on the voice file.

The Third Embodiment

On the basis of the same technical concept as those of the first embodiment and the second embodiment, the present embodiment provides a smart watch.

Figure 9:
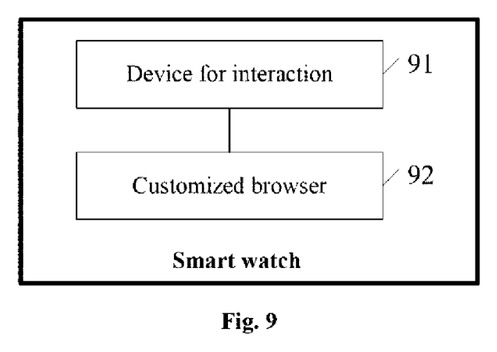
FIG. 9 is the schematic diagram of the structure of the smart watch provided by the third embodiment.

FIG. 9 is the schematic diagram of the structure of the smart watch provided by the present embodiment. As shown in FIG. 9, the smart watch comprises a device 91 for interaction, and the specifical operation mode of the device 91 for interaction can refer to the relevant description in the second embodiment; and the smart watch is provided with a customized browser 92 that is adapted to the smart watch, wherein the customized browser is able to log in on the webpage edition WECHAT platform.

A webpage interface of the customized browser is adapted to a screen of the smart watch, and the customized browser supports a preset application protocol and a preset communication protocol, wherein the preset application protocol comprises at least a Hypertext Transfer Protocol (HTTP) and a User Datagram Protocol (UDP), and the preset communication protocol comprises at least a Bluetooth Network Encapsulation Protocol (BNEP).

The customized browser of the present embodiment enables its webpage interface to be adapted to the screen of the smart watch by the following method:

acquiring a system architecture of the webpage edition WECHAT platform, and determining functional modules that constitute the webpage edition WECHAT based on the acquired system architecture of the webpage edition WECHAT platform;

based on a size and a shape of the screen of the smart watch, determining a layout mode of the functional modules of the webpage edition WECHAT in the webpage interface of the customized browser; and in accordance with the layout mode of the functional modules of the webpage edition WECHAT in the webpage interface of the customized browser, displaying the functional modules in the webpage interface of the customized browser.

The customized browser is configured with a user interface interaction mode, wherein the user interface interaction mode comprises a friend list interface mode, a chatting record interface mode and a replying interface mode; and the method comprises:

when the customized browser is switched to the friend list interface mode, in response to a slipping operation by the user on the screen of the smart watch, displaying one or more friend list information on the screen;

when the customized browser is switched to the chatting record interface mode, in response to a slipping operation by the user on the screen of the smart watch, displaying one or more chatting record information on the screen; and when the customized browser is switched to the replying interface mode, in response to a point-and-click operation or long-pressing operation by the user on the screen of the smart watch, generating WECHAT replying message and displaying the generated WECHAT replying message on the screen.

In conclusion, the present disclosure provides a method and device for interaction between a smart watch and WECHAT platform, and a smart watch. The present disclosure provides a customized browser on a smart watch end, and after the Bluetooth pairing and connecting between the smart watch and the mobile telephone is completed, the customized browser of the smart watch end may wirelessly connect to the network side via Bluetooth, to improve the overall stand-by time of the smart watch end by using the characteristic of low power dissipation of Bluetooth wireless connection; and after the smart watch end is connected to the network end, log in on the webpage edition WECHAT platform by using the customized browser, and on the basis of the Bluetooth transport protocol, exchange data with the WECHAT platform, to realize WECHAT message replying on the smart watch end.

The above descriptions are merely preferable embodiments of the present disclosure, and are not limiting the protection scope of the present disclosure. Any modifications, equivalent substitutions or improvements that are made within the spirit and principle of the present disclosure are all included in the protection scope of the present disclosure.

The invention claimed is:

1. A method for interaction between a smart watch and a WECHAT platform, wherein the method comprises:

providing a customized browser that is adapted to the smart watch on the smart watch end, wherein the customized browser is able to access a webpage edition WECHAT platform;

wirelessly connecting and pairing the smart watch end with a mobile telephone end, and after the pairing is successfully completed, making the smart watch end wirelessly connect to a network side via the mobile telephone end;

after WECHAT function on the smart watch starts up, accessing the webpage edition WECHAT platform by the customized browser, and logging in on the webpage edition WECHAT platform based on user information that is bound on the mobile telephone end; and upon receiving a WECHAT message reminder that is pushed by the webpage edition WECHAT platform to the smart watch end, generating a WECHAT replying message based on an instruction that is input by the user, and transmitting the WECHAT replying message to the network side, via the wireless connection, to perform WECHAT replying.

2. The method for interaction according to claim 1, wherein, a webpage interface of the customized browser is adapted to a screen of the smart watch, and the customized browser supports a preset application protocol and a preset communication protocol; and wherein the preset application protocol comprises at least a Hypertext Transfer Protocol (HTTP) and a User Datagram Protocol (UDP), and the preset communication protocol comprises at least a Bluetooth Network Encapsulation Protocol (BNEP).

3. The method for interaction according to claim 2, wherein, enabling the webpage interface of the customized browser to be adapted to the screen of the smart watch by the following method:
   acquiring a system architecture of the webpage edition WECHAT platform, and determining functional modules that constitute the webpage edition WECHAT based on the acquired system architecture of the webpage edition WECHAT platform;
   based on a size and a shape of the screen of the smart watch, determining a layout mode of the functional modules of the webpage edition WECHAT in the webpage interface of the customized browser; and
   in accordance with the layout mode of the functional modules of the webpage edition WECHAT in the webpage interface of the customized browser, displaying the functional modules in the webpage interface of the customized browser.

4. The method for interaction according to claim 1, wherein, the instruction that is input by the user comprises a text instruction and a voice instruction, and the generating a WECHAT replying message based on an instruction that is input by the user comprises:
   collecting user voice on the smart watch end, converting the collected user voice into a text, and generating a text instruction based on the converted text;
   or, collecting user voice on the smart watch end, generating a voice file from the collected user voice, and generating a voice instruction based on the voice file.

5. The method for interaction according to claim 1, wherein, the providing a customized browser that is adapted to the smart watch on the smart watch end comprises:
   configuring a user interface interaction mode of the customized browser and a switching mode between different user interface interaction modes, wherein the user interface interaction mode comprises a friend list interface mode, a chatting record interface mode and a replying interface mode; and
   when the customized browser is switched to the friend list interface mode, in response to an operation by the user on the screen of the smart watch, displaying one or more friend list information on the screen;
   when the customized browser is switched to the chatting record interface mode, in response to an operation by the user on the screen of the smart watch, displaying one or more chatting record information on the screen; and
   when the customized browser is switched to the replying interface mode, in response to a point-and-click operation or long-pressing operation by the user on the screen of the smart watch, generating WECHAT replying information and displaying the generated WECHAT replying information on the screen.

6. A device for interaction between a smart watch and a WECHAT platform, wherein, the device for interaction comprises:
   a wireless network connecting module, for wirelessly connecting and pairing the smart watch end with a mobile telephone end, and after the pairing is successfully completed, wirelessly connecting the smart watch end to a network side via the mobile telephone end;
   an accessing and logging-in module, for after WECHAT function on the smart watch starts up, accessing a webpage edition WECHAT platform by a customized browser that is preset and is adapted to the smart watch, and logging in on the webpage edition WECHAT platform based on user information that is bound on the mobile telephone end; and
   a replying module, for upon receiving a WECHAT message reminder that is pushed by the webpage edition WECHAT platform to the smart watch end, generating a WECHAT replying message based on an instruction that is input by the user, and transmitting the WECHAT replying message to the network side, via the wireless connection, to perform WECHAT replying.

7. The device for interaction according to claim 6, wherein, the wireless network connecting module is specifically for wirelessly connecting the smart watch end and the mobile telephone end by a Bluetooth Network Encapsulation Protocol (BNEP).

8. The device for interaction according to claim 6, wherein, the interaction device further comprises: an inputting module; and
   the inputting module is for collecting user voice on the smart watch end, converting the collected user voice into a text, and generating a text instruction based on the converted text; or, for collecting user voice on the smart watch end, generating a voice file from the collected user voice, and generating a voice instruction based on the voice file.

9. A smart watch, wherein, the smart watch comprises a device for interaction between the smart watch and a WECHAT platform, wherein, the device for interaction comprises:
   a wireless network connecting module, for wirelessly connecting and pairing the smart watch end with a mobile telephone end, and after the pairing is successfully completed, wirelessly connecting the smart watch end to a network side via the mobile telephone end;
   an accessing and logging-in module, for after WECHAT function on the smart watch starts up, accessing a webpage edition WECHAT platform by a customized browser that is preset and is adapted to the smart watch, and logging in on the webpage edition WECHAT platform based on user information that is bound on the mobile telephone end; and
   a replying module, for upon receiving a WECHAT message reminder that is pushed by the WECHAT platform to the smart watch end, generating a WECHAT replying message based on an instruction that is input by the user, and transmitting the WECHAT replying message to the network side, via the wireless connection, to perform WECHAT replying; and
   the smart watch is provided with a customized browser that is adapted to the smart watch, wherein the customized browser is able to log in on the webpage edition WECHAT platform.

10. The smart watch according to claim 9, wherein, a webpage interface of the customized browser is adapted to a screen of the smart watch, and the customized browser supports a preset application protocol and a preset communication protocol; and wherein the preset application protocol comprises at least a Hypertext Transfer Protocol (HTTP) and a User Datagram Protocol (UDP), and the preset communication protocol comprises at least a Bluetooth Network Encapsulation Protocol (BNEP).

11. The smart watch according to claim 10, wherein, the customized browser enables the webpage interface thereof to be adapted to the screen of the smart watch by the following method:
acquiring a system architecture of the webpage edition WECHAT platform, and determining functional modules that constitute the webpage edition WECHAT based on the acquired system architecture of the webpage edition WECHAT platform;
based on a size and a shape of the screen of the smart watch, determining layout mode of the functional modules of the webpage edition WECHAT in the webpage interface of the customized browser; and
in accordance with the layout mode of the functional modules of the webpage edition WECHAT in the webpage interface of the customized browser, displaying the functional modules in the webpage interface of the customized browser.

12. The smart watch according to claim 9, wherein, the customized browser is configured with a user interface interaction mode, wherein the user interface interaction mode comprises a friend list interface mode, a chatting record interface mode and a replying interface mode; and
when the customized browser is switched to the friend list interface mode, in response to an operation by the user on the screen of the smart watch, displaying one or more friend list information on the screen;
when the customized browser is switched to the chatting record interface mode, in response to an operation by the user on the screen of the smart watch, displaying one or more chatting record information on the screen; and
when the customized browser is switched to the replying interface mode, in response to a point-and-click operation or long-pressing operation by the user on the screen of the smart watch, generating WECHAT replying message and displaying the generated WECHAT replying information on the screen.

13. The smart watch according to claim 9, wherein, the wireless network connecting module is specifically for wirelessly connecting the smart watch end and the mobile telephone end by a Bluetooth Network Encapsulation Protocol (BNEP).

14. The smart watch according to claim 9, wherein, the interaction device further comprises: an inputting module; and
the inputting module is for collecting user voice on the smart watch end, converting the collected user voice into a text, and generating a text instruction based on the converted text; or, for collecting user voice on the smart watch end, generating a voice file from the collected user voice, and generating a voice instruction based on the voice file.

* * * * *